(12) United States Patent
Reiner

(10) Patent No.: US 7,748,522 B2
(45) Date of Patent: Jul. 6, 2010

(54) CONVEYOR DEVICE

(75) Inventor: Glotzl Reiner, Pentling (DE)

(73) Assignee: Krones AG, Neutraubling (DE)

( * ) Notice: Subject to any disclaimer, the term of this patent is extended or adjusted under 35 U.S.C. 154(b) by 62 days.

(21) Appl. No.: 11/596,263

(22) PCT Filed: Nov. 19, 2005

(86) PCT No.: PCT/EP2005/012405

§ 371 (c)(1),
(2), (4) Date: Mar. 9, 2007

(87) PCT Pub. No.: WO2006/056372

PCT Pub. Date: Jun. 1, 2006

(65) Prior Publication Data

US 2007/0215440 A1    Sep. 20, 2007

(30) Foreign Application Priority Data

Nov. 25, 2004    (DE) .................... 10 2004 056 858

(51) Int. Cl.
*B65G 15/00*    (2006.01)
(52) U.S. Cl. .................. 198/836.1; 198/836.4
(58) Field of Classification Search ............. 198/735.1, 198/735.2, 735.6, 778, 836.1–836.4, 860.1–860.3
See application file for complete search history.

(56) References Cited

U.S. PATENT DOCUMENTS

| | | | | | |
|---|---|---|---|---|---|
| 1,929,707 | A | * | 10/1933 | Mojonnier | 198/836.3 |
| 1,957,534 | A | * | 5/1934 | Gladfelter | 198/480.1 |
| 2,031,054 | A | * | 2/1936 | McCarthy | 198/860.3 |
| 2,105,889 | A | * | 1/1938 | Madeira | 198/836.1 |
| 2,344,832 | A | * | 3/1944 | Rosengren | 411/553 |
| 3,193,077 | A | * | 7/1965 | Goldberg | 198/836.1 |
| 3,568,263 | A | * | 3/1971 | Meehan | 269/91 |
| 3,581,877 | A |   | 6/1971 | Goldberg | |
| 3,811,157 | A | * | 5/1974 | Schenk | 411/349 |
| 4,225,035 | A | * | 9/1980 | Mohney et al. | 198/836.3 |
| 4,312,697 | A | * | 1/1982 | Brummett | 198/836.3 |
| 4,422,542 | A | * | 12/1983 | Temme et al. | 198/735.1 |

(Continued)

FOREIGN PATENT DOCUMENTS

CN    1316968 A    10/2001

(Continued)

OTHER PUBLICATIONS

Notification of the First Office Action issued by the Patent Office of the People's Republic of China dated May 15, 2009.

*Primary Examiner*—Gene Crawford
*Assistant Examiner*—William R Harp
(74) *Attorney, Agent, or Firm*—Marshall, Gerstein & Borun LLP

(57) ABSTRACT

A conveyor device for bottles in particular, having a frame and a replaceable guide for the material, the guide being lockable on the frame for the material to be conveyed. To make such a guide easier to handle, easier to store and easier to install, the guide is designed in multiple parts, a first guide part being provided with a central lock device and designed as a locking means for a second guide part which is equipped with a locking stop.

16 Claims, 4 Drawing Sheets

U.S. PATENT DOCUMENTS

| | | | | |
|---|---|---|---|---|
| 4,877,125 A | * | 10/1989 | Gordon | 198/836.1 |
| 5,123,767 A | * | 6/1992 | Ishikura et al. | 403/24 |
| 5,682,976 A | * | 11/1997 | Jorgensen | 198/836.3 |
| 5,711,137 A | * | 1/1998 | Moncrief et al. | 53/534 |
| 6,105,338 A | * | 8/2000 | Kalany et al. | 53/252 |
| 6,260,245 B1 | * | 7/2001 | Marsetti | 24/658 |
| 6,516,938 B1 | * | 2/2003 | Paselsky et al. | 198/419.3 |
| 6,763,935 B2 | * | 7/2004 | Ostman | 198/836.1 |
| 2008/0116042 A1 | * | 5/2008 | McAlister et al. | 198/836.3 |

FOREIGN PATENT DOCUMENTS

| | | |
|---|---|---|
| JP | 2000320522 A | 11/2000 |
| WO | WO-98/18698 | 5/1998 |
| WO | WO 0104026 A1 | 1/2001 |

* cited by examiner

CONVEYOR DEVICE

CROSS-REFERENCE TO RELATED APPLICATION

This is the U.S. national stage under 35 U.S.C. §371, of international application no. PCT/EP2005/012405, having an international filing date of Nov. 19, 2005, and claims priority to German application no. 10 2004 056 858.8 filed on Nov. 25, 2004.

FIELD OF THE DISCLOSURE

The present disclosure relates to a conveyor device, such as used in bottling operations.

BACKGROUND OF THE DISCLOSURE

With conveyor devices, it is often necessary to keep the material being conveyed on the conveyor path with the help of a guide and/or direct it onto the conveyor path. Such guides have a main surface which is either in contact with the material being conveyed in running contact or becomes immediately engaged with the material being conveyed as soon as the material being conveyed attempts to leave the specified conveyor path. However, if the conveyor device is suitable for conveying goods of different sizes or is to be used for such a purpose, a guide permanently mounted on the conveyor path may become a problem, in particular when the guide must be in running engagement with the material being conveyed. In the case of a conveyor device designed for models, it is already known that the guide should be designed to be replaceable. The conveyor device known from prior use has a guide wheel, preferably a guide star, which causes preferably a 180° change in the direction of conveyance. The guide star is provided with recesses that are open on the circumference and distributed uniformly, each recess accommodating a bottle arriving in the first conveyor direction and bringing the bottle around the 180° arc into the second direction of conveyance. To prevent the bottles from leaving the guide star in the curve due to centrifugal forces, for example, the guide star is surrounded with a guide arc which grips the outside of the bottles at least in the conveyor area. To also allow conveyance of even bottles of different sizes with this known conveyor device, this guide and optionally also the guide star are designed to be replaceable so that the conveyor device can easily be converted for use with bottles of different sizes. However, the known guide is designed in one piece and must be replaced as an entirety. The problem of storing this large and relatively bulky guide then arises. In addition, the known guide must be mounted at several locations to keep the guide securely on the frame at the predetermined location.

SUMMARY OF THE DISCLOSURE

The object of the present disclosure in comparison with the related art is to create a conveyor device having a replaceable and lockable guide that is easy to handle and can be stored conveniently.

The present disclosed embodiment creates a guide that can be transported and stored much more easily due to the fact that it consists of multiple parts. Although multiple parts must be installed for the disclosed guide, the central lock ensures that assembly of the multipart guide must in no case proceed more slowly and with greater complexity than is the case with the one-part guide. Due to the disclosed embodiment, it is adequate to lock only one of the guide parts while the other guide part is held by the centrally locked guide part and by a locking stop.

The locking stop is expediently part of a positioning device which specifies the exact position of the second guide part within the conveyor device.

Assembly is further facilitated if a positioning device is provided on the first centrally locked guide part.

Assembly is further facilitated and accelerated if a plug-and-shift guide is used.

Use of a hold-down device between the second and preferably also the first guide part and the frame increases the security of the fastening and reduces the risk that soiling, e.g., broken glass or the like can get between the guide and the frame.

An especially simple and preferred exemplary embodiment of the plug-and-shift guide includes at least one combination of a bolt and an opening, the bolt having a shaft and a larger head on the other end and the opening having two areas of different sizes, whereby the head fits through the larger area but does not fit through the smaller area and the smaller area holds the shaft so the bolt is secured by its head in the axial direction and by its shaft in the radial direction so that the shaft can move in only one direction in the opening.

However, it is also conceivable for the shaft not to be profiled but instead to be designed to be round on the whole. Then the larger areas of the openings are arranged in the direction of the force line of the containers to be transported in the conveyor device in order to prevent shifting of the guide parts on the bolts. This embodiment has the advantage that the bolts need not be aligned during assembly due to the fact that the profiling on the shafts is omitted because the bolts can move in any position only up to the stop surface.

The opening expediently also contains the locking stop which preferably cooperates with the shaft. The central lock is preferably achieved by clamps because such a design is relatively simple to manufacture and easy to lock and unlock, whereby the clamp is preferably formed by a self-locking effect of the central lock.

This is preferably accomplished by rotating a clamping bolt having a non-round clamping area in an opening which holds the clamping area with a radial clamping effect.

If the clamping bolt is also provided with an enlarged head, the latter may form an axial security means in cooperation with a suitable opening so that the first guide part is secured against movement in all directions.

However, the central lock may also be provided by other elements such as a locking bar or pneumatic, hydraulic or electric elements.

Pressure surfaces are preferably formed between the guide parts, allowing the guide parts to be aligned directly one after the other without any gaps and ensuring secure locking of the guide parts that are locked only indirectly.

The present disclosure is suitable in particular for a guide curve for cooperating with a guide wheel but it may also be designed to be used for other purposes such as linear guides in cooperation with a conveyor screw.

If the guide parts are provided with the openings and the frame is provided with the bolts, then first of all, the bolts for guide parts of different sizes may be reused while the guide parts do not have any protruding elements that could interfere with storage.

The bolts preferably have a supporting surface for the guide part, making it possible for the guide part to be mounted at a predetermined distance from the frame so that no soiling can be deposited beneath it.

In a preferred embodiment, the guide parts are made of stainless steel to achieve good cleaning properties on the one hand while also having good stability in the creation of openings in the guide parts. The openings accelerate, i.e., allow the runoff of spray fluid, cleaning fluid or residual fluid to run off. Such guide parts may then be used in aseptic machinery, for example, where the demands of the material and the design with regard to sterility and therefore, cleanability are particularly high.

BRIEF DESCRIPTION OF THE DRAWINGS

An exemplary embodiment of the present disclosure is explained in greater detail below on the basis of the drawings, in which:

FIG. 3 shows a schematic diagram of components of the central lock, where FIG. 4 shows the components of a plug-and-shift guide, where

DETAILED DESCRIPTION OF THE DISCLOSURE

Figure 1:
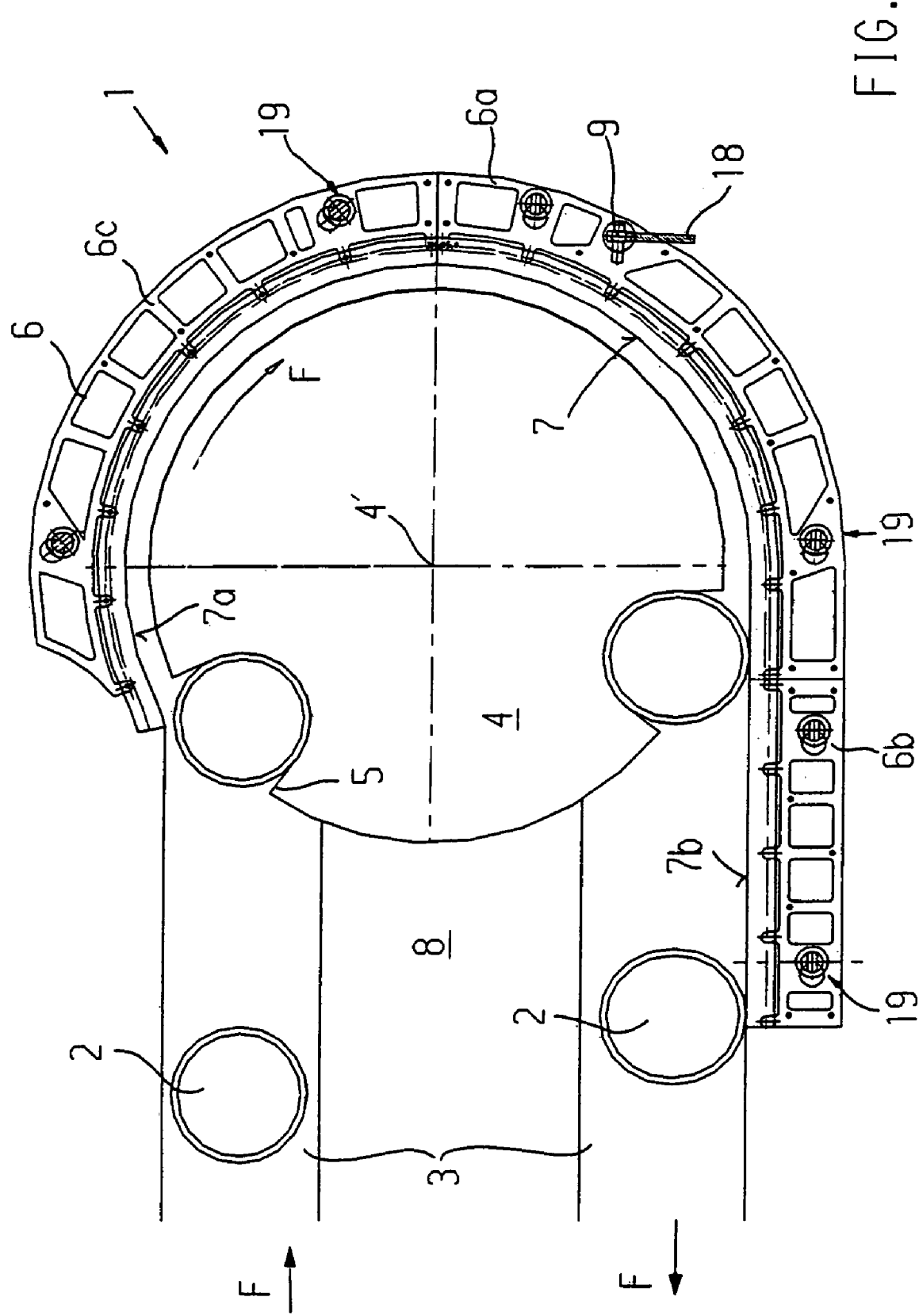
FIG. 1 shows a schematic diagram of a top view of a part of a disclosed conveyor device.

FIG. 1 shows a schematic diagram of a part of an exemplary embodiment of a conveyor device 1 designed according to the disclosure for conveying goods. In the exemplary embodiment depicted here, the conveyor device 1 is designed for conveying containers 2 for beverages, in particular bottles. The containers 2 are supplied by a suitable conveyor (a conveyor belt 3 is shown here) in the direction of conveyance F. To implement a change in the direction of conveyance, the conveyor 3 runs into the area of a guide wheel 4, which is designed as a guide star in the exemplary embodiment shown here and has a plurality of recesses 5 open on the periphery, these recesses being designed with dimensions so that they contain and guide the container 2 in any suitable location along the longitudinal axis of the container, conveying it around the desired curve and then delivering it at a suitable location, e.g., onto another conveyor 3 in the form of a conveyor belt. In the exemplary embodiment depicted here, only two recesses 5 are shown, but it is clear that the guide wheel 4 has a plurality of recesses 5 distributed uniformly around the circumference.

To prevent the container 2 from leaving the recesses 5 prematurely, a guide labeled as 6 on the whole is provided. The guide 6 is designed as a guide curve and includes a baffle 7 extending around the guide wheel 4 over a predetermined angular range, curving coaxially with the axis of rotation 4' and maintaining a predetermined distance from the circumference of the guide wheel 4. In the exemplary embodiment shown here, the baffle 7 has a curved area 7a extending over an angular range of more than 180° and ending in a straight area 7b which is connected to the outlet end of the guide wheel 4. The guide 6 is provided with openings which reduce the weight on the one hand while on the other hand also preventing an accumulation of moisture, bacteria or the like.

The conveyor device 1 also has a frame, which is shown here in the form of a mounting surface 8 and on which the guide wheel 4, for example, is mounted.

The guide 6 is designed in multiple parts and includes a first guide part 6a which is provided with a central lock 9. The guide part 6a can be actively locked to the frame 8 with the help of the central lock 9.

In addition to the first active guide part 6a, the guide 6 also includes at least one second guide part that is to be locked passively; two of these passive guide parts 6b, 6c are shown in the exemplary embodiment illustrated here. The passive guide parts 6b, 6c are locked to the frame 8 by the first guide part 6a and its central lock 9. Each guide part 6a, 6b, 6c is designed essentially in the form of a strip and includes a part of the common baffle 7, whereby the guide parts 6a, 6b, 6c are designed with dimensions such that the baffle 7 runs essentially without a shoulder.

The central lock 9 is shown in greater detail in FIG. 3. The central lock 9 has a bolt 10 that can be rotated about an axis of rotation 10' and a respective opening 11. In the exemplary embodiment shown here, the bolt 10 is assigned to the frame 8 and is preferably screwed onto it by a thread 12. The opening 11 is provided in the guide part 6a.

The locking bolt 10 has a clamping part 13 in the form of a non-round bolt area. With a first smaller dimension k and a second larger dimension g, preferably forming a right angle with one another and running essentially symmetrically with a longitudinal midline or axis A.

The locking bolt 10 also has a head 14 that is enlarged in comparison with the clamping area 13 and also has a smaller dimension and a larger dimension essentially symmetrical with the axis A. The smaller dimension of the head 14 corresponds to the dimension k, while the rectangular larger dimension f running at a right angle to the former is larger than the dimension g.

The dimensions k, g and f are coordinated with the dimensions of the opening 11 so that the head 14 can be inserted with the clamping part 13 through the opening 11 in at least one direction, and the clamping part 13 can be rotated within the opening 111 about the axis of rotation 10' into a clamping position, and the head 14 no longer fits through the opening 11 when in the clamped position but instead rests on the guide part 6a on both sides of the opening 11. To this end, the opening 11 also has a smaller dimension 1, which is essentially symmetrical with the axis A and is equal to or greater than k but smaller than g and f, and has a larger dimension h, which is equal to or greater than f. In addition, the opening 11 has an enlarged area 11a to facilitate the clamping effect, with a width m which is greater than 1 but smaller than g.

The locking bolt 10 also has a supporting area 15 that acts a spacer from the frame 8 a supporting surface 15a which is larger than the clamping area 13 and is situated on the side opposite the head 14. The head 14 also has a clamping aid 16 in the form of a clamping wedge or the like on the bottom side which faces the supporting surface 15a, thereby increasing the friction and compensating for any differences in dimensional tolerance.

The locking bolt 10 is also provided with a fastening device 17 for a handle 18 in the form of a hand toggle, which is designed as a threaded bore in the exemplary embodiment shown here for screwing in the hand toggle 18.

Figure 4A:
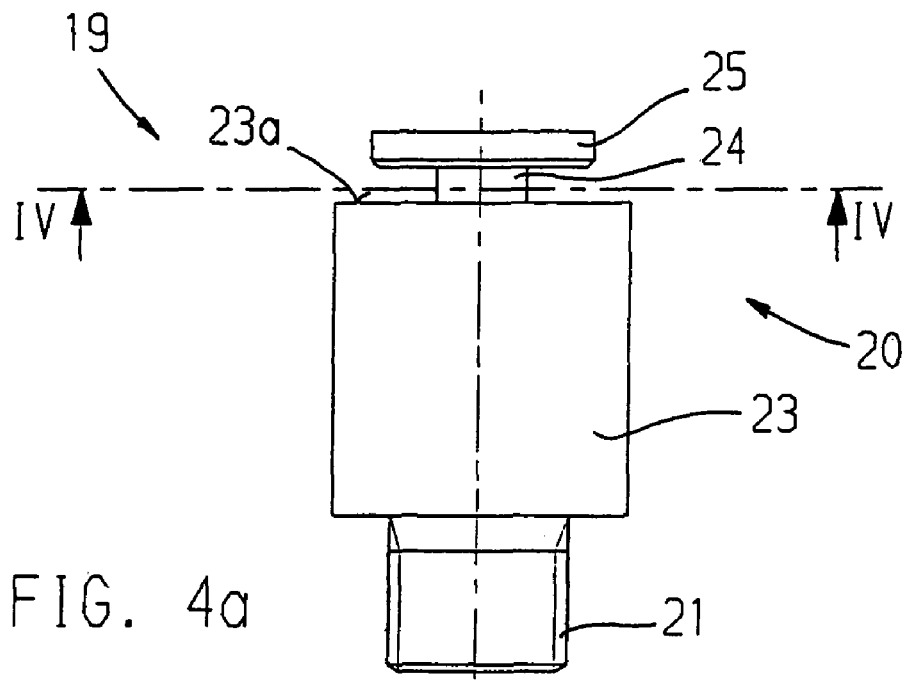
FIG. 4A shows a side view of the bolt.
Figure 4B:
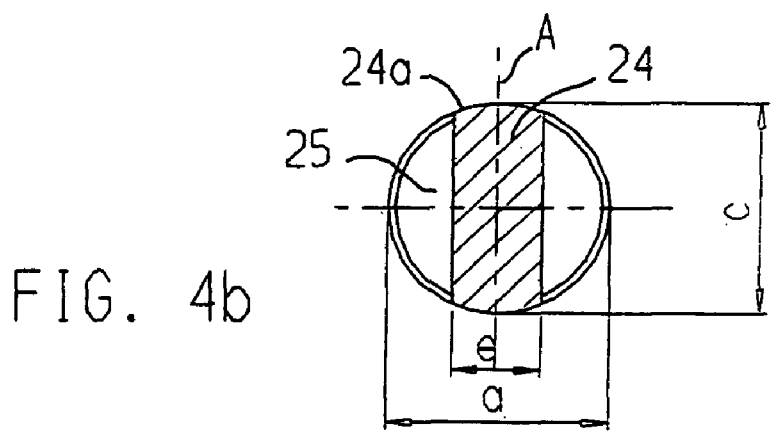
FIG. 4B shows section IV-IV and FIG. 4C shows the respective opening.
Figure 4C:
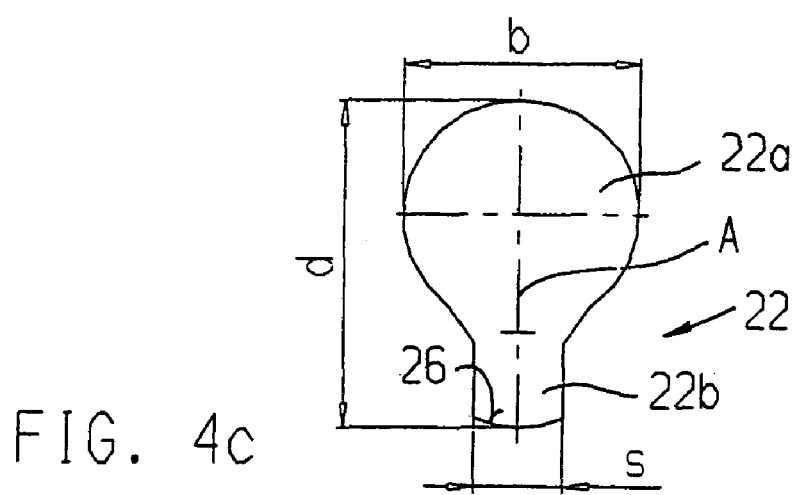

The inventive guide 6 also has a locking stop against which the passive guide parts 6b, 6c are pressed by the active guide part 6a. The inventive guide 6 also includes a positioning device which specifies the predetermined position of some or all guide parts with respect to one another and with respect to the frame. In addition, the inventive guide 6 also includes a hold-down device which presses the guide 6 against the frame. All these functions are fulfilled in the exemplary embodiment shown here by the plug-and-shift connection 19 which is explained in greater detail on the basis of FIG. 4.

The plug-and-shift connection 19 includes a bolt 20, which, in the exemplary embodiment shown here, is assigned to the frame 8 and is preferably screwed into the frame by means of a thread 21 and has an opening 22, which is provided in the guide 6.

The bolt 20 has a supporting area 23 with an upper supporting surface 23a, the function of which corresponds to that of the supporting area 15, and a smaller shaft area 24 and a larger head 25 on the opposite end. The opening 22 is essentially in the shape of a keyhole with a wider area 22a and a narrower area 22b, so it is essentially symmetrical with the axis A and is of dimensions so that the head 25 fits through the wider area 22a but not through the narrower area 22b while the shaft area 24 is held in the narrower area 22b. Here again, the areas 22a and 22b are aligned along the axis A.

In particular, the head 25 has an essentially circular cross section with a diameter a, which is less than or equal to a diameter b of the wider area 22a, which is also preferably circular in shape. The shaft area 24 has a first larger dimension c, which corresponds approximately to the diameter a and is smaller than the length d of the opening 22 along the axis A and has a second smaller dimension e across the axis A, which is equal to or less than the width s across the axis A of the narrower region 22b of the opening 22. In this way, the bolt with its head 25 can be passed through the wider area 22a of the opening 22 until the stop face 23a comes in contact with the bottom side of the guide 6, whereby the shaft area 24 may enter the narrower area 22b in the subsequent displacement of the opening 22 along the axis A until a bordering surface 26 in the narrower area 22b, extending across the axis A, comes to rest against the facing narrow side 24a of the shaft area 24. Then the head 25 is in contact with the guide 6 on both sides of the narrower area 22b of the opening 22 and serves as a hold-down device.

Figure 2:
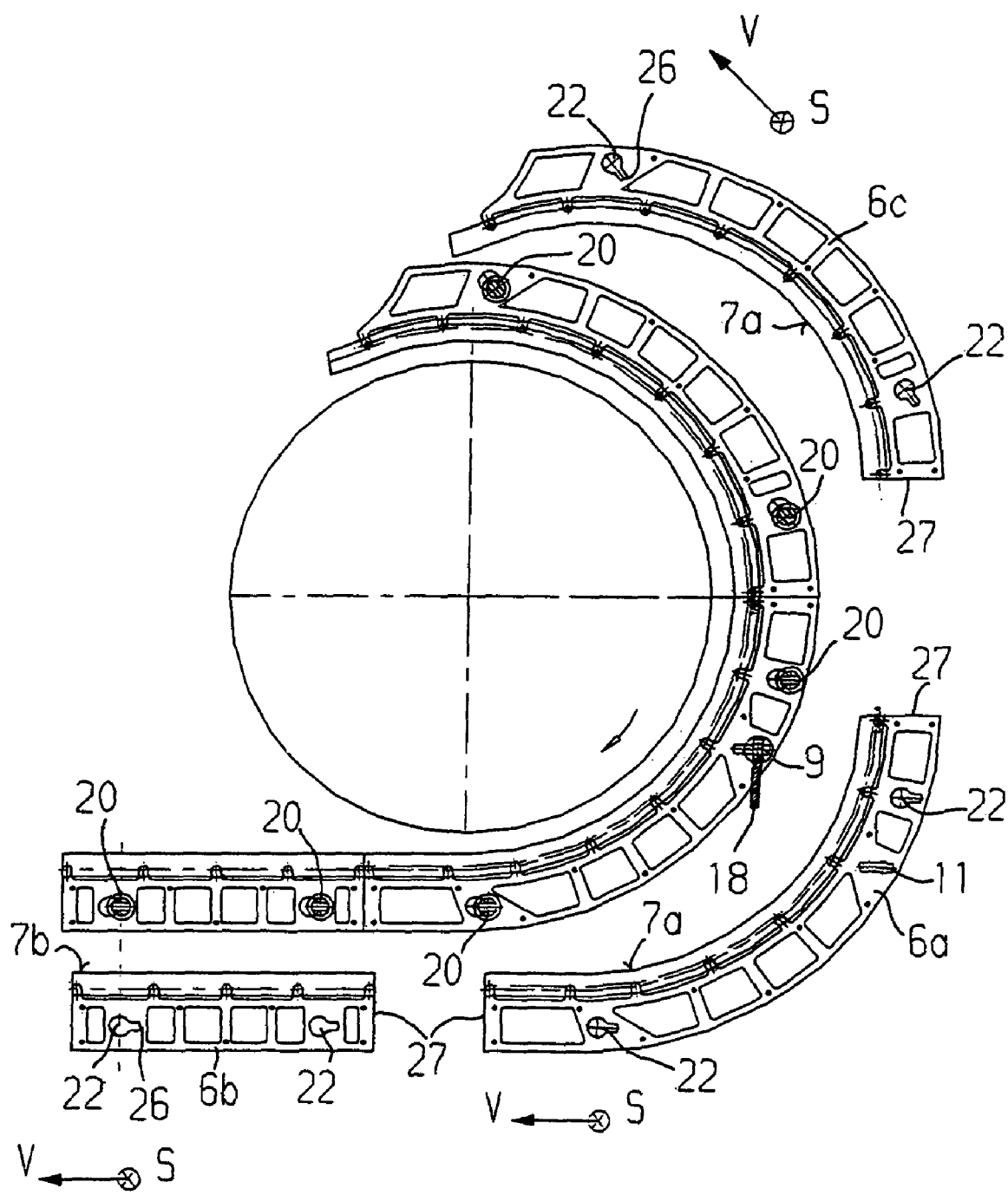
FIG. 2 shows a view like that in FIG. 1, where the guide parts are shown individually again to illustrate the assembly steps.
Figure 3A:
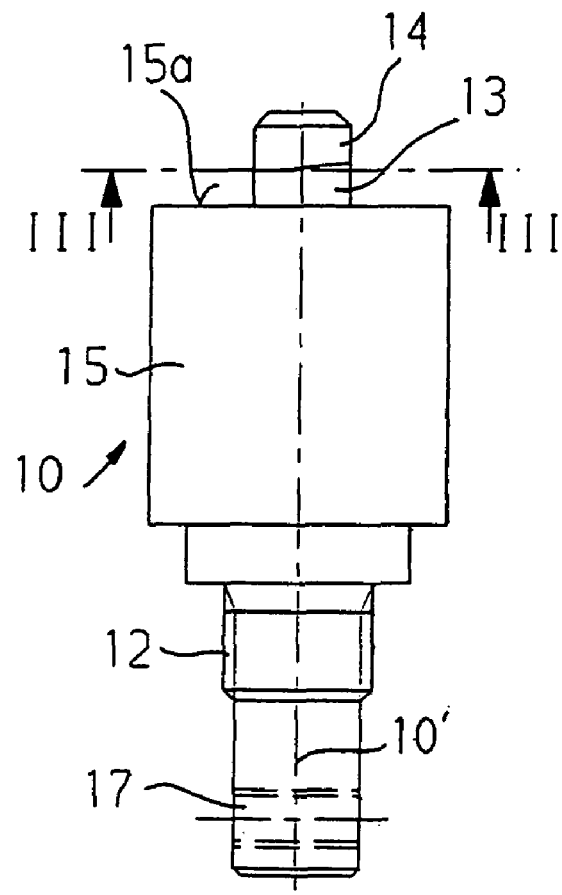
FIG. 3A shows a clamping bolt in a side view.
Figure 3B:
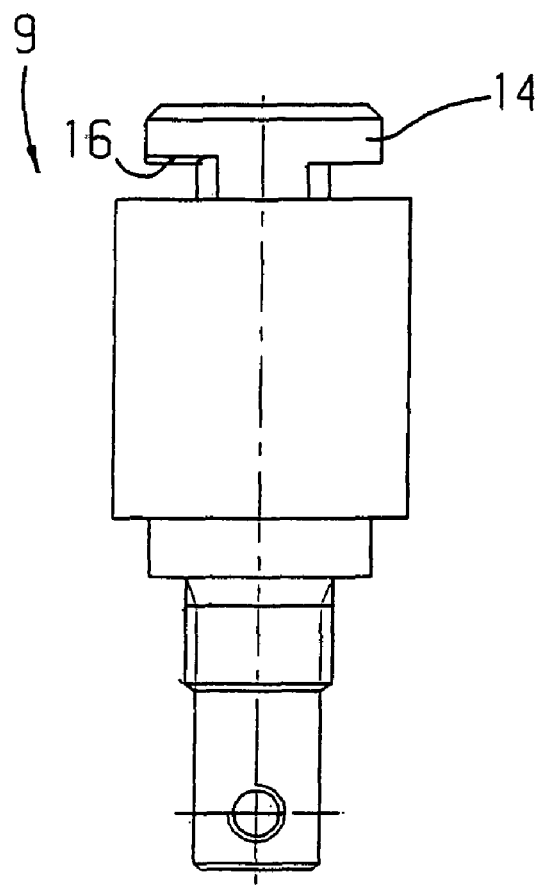
FIG. 3B shows the clamping bolt in a front view.
Figure 3C:
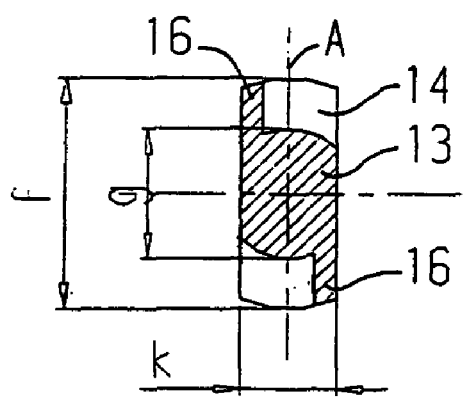
FIG. 3C shows section III-III from FIG. 3A
Figure 3D:
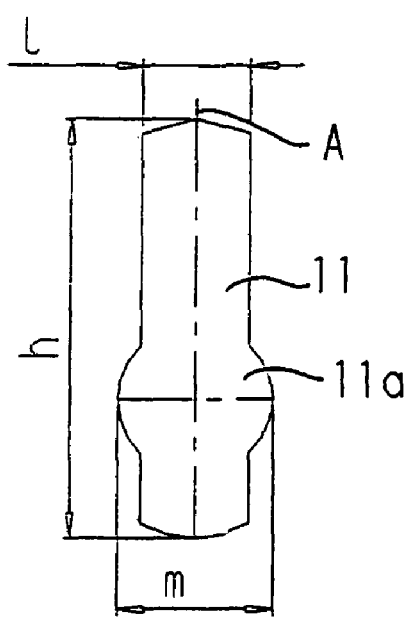
FIG. 3D shows the opening of the central lock.

As shown in FIG. 2 in particular, each of the guide parts 6a, 6b and 6c preferably has at least two of the openings 22 (twist-proof), each cooperating with a bolt 20 which is provided at the predetermined position for the corresponding guide part 6a, 6b, 6c on the frame 8.

As FIG. 2 shows, the axes A of all openings 22 in each guide part 6a, 6b and 6c are all aligned in the same direction. The axes A are aligned in the straight linear guide part 6b and run parallel to one another in each of the curved guide parts 6a, 6c. The openings 22 are also aligned so that the narrower areas 22b inside each guide part 6a, 6b and 6c point in the same direction. The axis A of the opening 11 of the central lock 9 in the active guide part 6A runs parallel to the axes A of the openings 22 in this guide part 6a.

The bolts 10 and 20 and the respective openings 11 and 22 thus form a plug-and-shift connection 19 for each of the guide parts provided with this connection.

For assembly of the guide 6, first the two passive guide parts 6b and 6c are pushed onto the bolts 20 in the direction of the arrow S perpendicular to FIG. 2, so that the openings 22 are placed on the bolts 20 and then shifted in a direction V parallel to the plane of FIG. 2 so far along their axis A that the respective passive guide part comes to a stop against a locking stop which is formed in the exemplary embodiment shown here by the stop surface 26 running across the axis A, the surface belonging to at least one of the openings 22 in each guide part 6b, 6c against which surface the end face 24a of the shaft 24 comes to rest. In doing so, the head 25 of the bolt 20 grips over the narrower area 22b on both sides and thus acts as a hold-down device holding the respective guide parts 6b, 6c in contact with the supporting surfaces 23b of the bolt 20 and thus holding them against the frame 8.

Then the guide part 6a that is to be locked actively is mounted by placing it with its openings 22 on the corresponding bolts 20 in the direction of the arrow S and with its opening 11 on the locking bolt 10 until the heads 25 and 14 have passed through the respective openings 22 and 11. Then the active guide part 6a is also shifted in the displacement direction V until the pressure surfaces 27 of all three guide parts abut against one another and the lead faces 7 of all guide parts are flush with one another without any shoulders. Then the locking bolt 10 of the central lock 9 is pivoted about the axis 10' with the help of handle 18 so that the clamping part 13 is clamped in the enlarged area 11a of the opening 11 and the head 14 rests on the guide part 6a with its clamping wedges 16 on both sides of the opening 11 and thus also functions as a hold-down device. In this way, the position of the pressure surfaces 27 in which they are pressed together is secured, and the passive guide parts 6b, 6c are locked by the active guide part 6a, i.e., secured between the pressure surfaces 27 and the locking stops 26.

It can be seen clearly in FIG. 2 that the alignment of the axes A of the openings 22 and/or 11 should be selected so that at least one component of the locking force exerted by the active guide part 6a acts against the locking stop 26. In addition, the alignment of the axes A should be selected so that displacement of the guide part to be installed last, i.e., the active guide part 6a, is still possible, although the two neighboring guide parts 6b, 6c are already in place. In the present exemplary embodiment, this is achieved by the fact that the axes A of the openings 22 of the active guide part 6a are aligned at a different angle to the curved guide face 7a and run in the linear guide part 6b so they are essentially parallel to the axes A of the openings 22 in one of the adjacent guide parts, namely in the exemplary embodiment shown here of the linear guide part 6b.

In a modification of the exemplary embodiment illustrated and described here, the individual functions of the locking stop, the positioning, the hold-down device, twist prevention and the like can be accomplished by different design elements. This disclosure can also be used when the guide contains only two parts or more than three guide parts. Different known designs may also be used as the central lock, but they should also achieve a fast clamping effect. This disclosure is also suitable for other guides in which conveyor goods are to be kept on conveyor paths in addition to the guide curves described here for guide wheels.

The invention claimed is:

1. Conveyor device, in particular for bottles, having a frame and a replaceable guide that can be locked onto the frame for material to be conveyed, the guide including multiple parts forming a common baffle, a first actively locked guide part that includes a part of the common baffle and is provided with a central lock device for locking the first guide part to the frame and operable as a locking means for a second passively locked guide part that includes a part of the common baffle and is provided with a locking stop, wherein the central lock device has a clamping part.

2. Conveyor device according to claim 1, wherein a positioning device which holds the locking stop is provided between the second guide part and the frame.

3. Conveyor device according to claim 1, wherein a positioning device is provided between the first guide part and the frame.

4. Conveyor device according to claim 1, wherein a plug-and-shift device is provided between the frame and the guide.

5. Conveyor device according to claim 4, wherein the plug-and-shift device includes at least one bolt having a shaft and a head that is larger than the shaft and which provides a hold-down device and also with an opening which in turn has a first and a second area, the first area being larger than or equal to the head and the second area being larger than or equal to the shaft but smaller than the head.

6. Conveyor device according to claim 5, wherein the second area of the opening is provided with the locking stop for the shaft.

7. Conveyor device according to claim 5, wherein the first and second guide parts each have at least two openings, and the bolt assigned to the frame has a shaft that provides a positioning device and a head that provides a hold-down device of the plug-and-shift guide.

8. Conveyor device according to claim 5, wherein the bolt has a supporting surface.

9. Conveyor device according to claim 1, wherein a hold-down device is provided between the second guide part and the frame.

10. Conveyor device according to claim 1, wherein a hold-down device is provided between the first guide part and the frame.

11. Conveyor device according to claim 1, wherein the central lock device has a locking bolt that can rotate about its axis and has a non-round clamping area and an opening which holds the clamping area with a radial clamping effect.

12. Conveyor device according to claim 11, wherein the locking bolt has a head that is larger than the clamping area and which provides a hold-down device.

13. Conveyor device according to claim 11, wherein the locking bolt has a supporting surface.

14. Conveyor device according to claim 1, and wherein pressure faces are provided between the guide parts.

15. Conveyor device according to claim 1, wherein the guide is a guide curve for cooperating with a guide wheel.

16. Conveyor device according to claim 1, wherein the guide is a linear guide which cooperates with an object allocating device.

* * * * *